United States Patent

Shimura et al.

(10) Patent No.: US 10,139,770 B2
(45) Date of Patent: Nov. 27, 2018

(54) POWER SOURCE DEVICE AND IMAGE FORMING APPARATUS

(71) Applicant: CANON KABUSHIKI KAISHA, Tokyo (JP)

(72) Inventors: Yasuhiro Shimura, Yokohama (JP); Hiroki Asano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/379,858

(22) Filed: Dec. 15, 2016

(65) Prior Publication Data

US 2017/0176918 A1 Jun. 22, 2017

(30) Foreign Application Priority Data

Dec. 18, 2015 (JP) .................. 2015-247609

(51) Int. Cl.
*G03G 15/00* (2006.01)
*H02M 1/00* (2006.01)
(Continued)

(52) U.S. Cl.
CPC ......... *G03G 15/80* (2013.01); *G03G 15/5004* (2013.01); *H02M 1/08* (2013.01);
(Continued)

(58) Field of Classification Search
CPC .... G03G 15/80; H02M 3/33507; H02M 1/08; H02M 3/33575; H02M 2001/0035; H02M 2001/0009
See application file for complete search history.

(56) References Cited

U.S. PATENT DOCUMENTS 6,088,243 A * 7/2000 Shin ................. H02J 9/005
363/21.05
6,275,018 B1 * 8/2001 Telefus ............. H02M 3/156
323/222
(Continued)

FOREIGN PATENT DOCUMENTS

JP 2014-27793 A 2/2014

OTHER PUBLICATIONS

U.S. Appl. No. 15/249,848, filed Aug. 29, 2016 Inventor: Yasuhiro Shimura.

(Continued)

*Primary Examiner* — G. M. Hyder
(74) *Attorney, Agent, or Firm* — Fitzpatrick, Cella, Harper & Scinto

(57) ABSTRACT

A power source device includes a transformer including a primary winding and a secondary winding; a switching element for enabling or disabling supply of electric power to the primary winding by a switching operation; a controller for controlling the switching operation, wherein the controller is capable of effecting continuous control in which the switching operation is continued and intermittent control in which a switching period in which the switching operation is performed and a rest period in which the switching operation is at rest are repeated, a calculating portion not operating in the rest period; and a measuring portion continuing operation even in the rest period. When a predetermined time has elapsed from a start of the rest period, the measuring portion causes the calculating portion to resume the operation thereof, and starts the switching period.

33 Claims, 12 Drawing Sheets

(51) Int. Cl.
*H02M 1/08* (2006.01)
*H02M 3/335* (2006.01)

(52) U.S. Cl.
CPC ... *H02M 3/33507* (2013.01); *H02M 3/33515* (2013.01); *H02M 2001/0009* (2013.01); *H02M 2001/0035* (2013.01); *Y02B 70/16* (2013.01)

(56) References Cited

U.S. PATENT DOCUMENTS

| | | | |
|---|---|---|---|
| 9,263,946 B2 | 2/2016 | Matsui | |
| 2004/0076022 A1* | 4/2004 | Hong | H02M 3/33523 363/21.01 |
| 2017/0005585 A1* | 1/2017 | Shimura | H02M 3/33569 |

OTHER PUBLICATIONS

U.S. Appl. No. 15/267,747, filed Sep. 16, 2016 Inventors: Yasuhiro Shimura, et al.
U.S. Appl. No. 15/174,222, filed Jun. 6, 2016 Inventors: Yasuhiro Shimura, et al.

\* cited by examiner

POWER SOURCE DEVICE AND IMAGE FORMING APPARATUS

FIELD OF THE INVENTION AND RELATED ART

The present invention relates to a power source device for effecting control of a switching power source using an insulating transformer and an image forming apparatus including the power source device.

In the switching power source, a switching operation is performed when an AC voltage of a commercial power source is converted into a DC voltage. In the switching power source, in order to reduce electric power consumption during sleep of a device in which a switching power source is mounted, in a state in which electric power outputted to a load is small (hereinafter referred to as a low load state), efficiency of the switching power source has been required to be improved. Here, the efficiency of the switching power source is represented as a ratio of electric power outputted by the switching power source to electric power supplied to the switching power source.

As a controller of the switching power source, a control logic circuit such as a CPU, a microcomputer or an ASIC is used, and a power source using the control logic circuit (hereinafter, referred to as a digital control power source) has been known. For example, as a known example of a method of improving the power source efficiency of the digital control power source in the low load state, an electric power supplying device as disclosed in Japanese Laid-Open Patent Application 2014-027793 has been proposed.

However, in the digital control power source using the insulating transformer, when intermittent control in the low load state is effected, the power source efficiency has been required to be further improved. Further, in the digital control power source, also in the low load state, there is a need to effect control while supplying a power source voltage so that the controller provided in a primary side of the insulating transformer can continue an operation.

SUMMARY OF THE INVENTION

The present invention enables not only an improvement in efficiency of a power source device in a low load state but also a continuous operation of a controller provided in a primary side of the power source device.

According to an aspect of the present invention, there is provided a power source device comprising: a transformer including a primary winding and a secondary winding; a switching element for enabling or disabling supply of electric power to the primary winding by a switching operation; a controller for controlling the switching operation, wherein the controller is capable of effecting continuous control in which the switching operation is continued and intermittent control in which a switching period in which the switching operation is performed and a rest period in which the switching operation is at rest are repeated, a calculating portion not operating in the rest period; and a measuring portion continuing operation even in the rest period, wherein when a predetermined time has elapsed from a start of the rest period, the measuring portion causes the calculating portion to resume the operation thereof, and starts the switching period.

According to another aspect of the present invention, there is provided an image forming apparatus comprising: an image forming portion for forming an image; and a power source device for supplying electric power to the image forming apparatus, wherein the power source device includes, a transformer including a primary winding and a secondary winding, a switching element for enabling or disabling supply of electric power to the primary winding by a switching operation, a controller for controlling the switching operation, wherein the controller is capable of effecting continuous control in which the switching operation is continued and intermittent control in which a switching period in which the switching operation is performed and a rest period in which the switching operation is at rest are repeated, a calculating portion not operating in the rest period, and a measuring portion continuing operation even in the rest period, wherein when a predetermined time has elapsed from a start of the rest period, the measuring portion causes the calculating portion to resume the operation thereof, and starts the switching period.

Further features of the present invention will become apparent from the following description of exemplary embodiments with reference to the attached drawings.

DESCRIPTION OF THE EMBODIMENTS

Embodiments of the present invention will be described specifically with reference to the drawings.

Embodiment 1

[Digital Control Power Source]

Figure 1A:
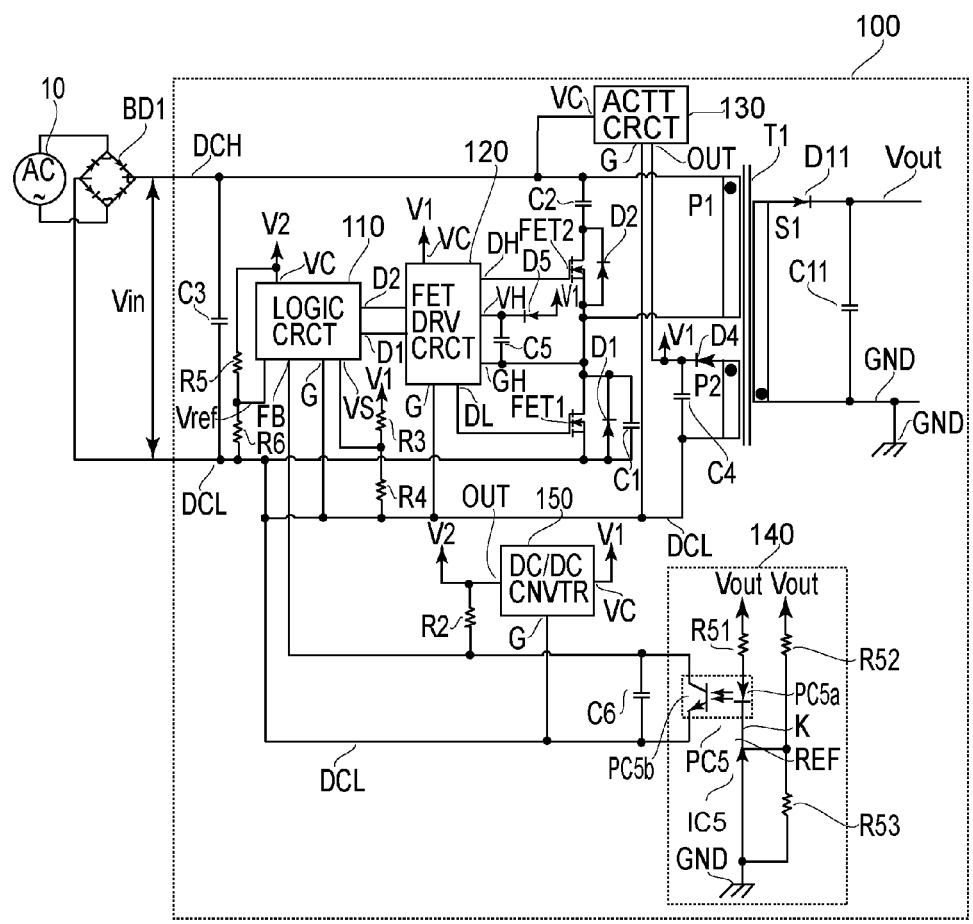
FIG. 1A is a diagram showing a power source device in Embodiment 1.

FIG. 1A is a schematic view of a digital control power source 100 using an active clamp type in Embodiment 1. An AC power source 10 such as a commercial power source outputs an AC voltage, and the AC outputted from the AC power source is rectified by a bridge diode BD1 which is a full-wave rectifying means. A voltage V in rectified by the bridge diode BD1 is inputted into the digital control power source 100. A smoothing capacitor C3 is a smoothing means for the voltage Vin, and a low-side potential of the smoothing capacitor C3 is DCL, and a high-side potential of the smoothing capacitor C3 is DCH.

The digital control power source 100 outputs a voltage Vout from the voltage Vin charged in the smoothing capacitor C3 to an insulated secondary side. In this embodiment, as the voltage Vout, for example, a constant voltage of 24 V is outputted. The digital control power source 100 includes an insulating transformer T1 in which a primary winding P1 and an auxiliary winding Ps are provided in a primary side and in which a secondary winding S1 is provided in the secondary side.

From the primary winding P1 to the secondary winding S1 of the transformer T1, energy is supplied by a switching operation of a FET (field-effect transistor)1 and FET2 which are switching elements described later. The auxiliary winding P2 of the transformer T1 rectifies and smooths a forward voltage of the voltage V in, applied to the primary winding P1, by a diode D4 and a capacitor C4, and is used for supplying a voltage V1. In the primary side of the digital control power source 100, the FET1 and the FET2 are connected. Specifically, the FET1 is series-connected with the primary winding P1 of the transformer T1. The FET2 series-connected with a capacitor C2 for voltage clamp is parallel-connected with the primary winding P1 of the transformer T1. Further, in the primary side of the digital control power source 100, a control logic circuit 110 as a control means for the FET1 and the FET2 and an FET driving circuit 120 are provided. A capacitor C1, for voltage resonance, parallel-connected with the FET1 is provided for reducing loss when the FET1 and the FET2 are changed from an on state to an off state. A diode D1 is a body diode for the FET1. Similarly, a diode D2 is a body diode for FET2.

In the secondary side of the digital control power source 100, a diode D11 and a capacitor C11 as a secondary-side rectifying and smoothing means for a flyback voltage generating in the secondary winding S1 of the transformer T1 are provided. Further, in the secondary side of the digital control power source 100, a feed-back circuit 140 as a feed-back means used for feeding back, toward the primary side, a voltage Vout to be outputted at the secondary side is provided.

In this embodiment, as the control logic circuit 110, a digital control circuit, such as a CPU or an ASIC, operating by a clock signal generated by a clock oscillating portion 115 described later is used. Details of the control logic circuit 110 will be described later with reference to FIG. 1B. By using the digital control circuit such as the CPU, complicated waveform control of control signals D1, D2 can be realized by an inexpensive integrated circuit.

Between a VC terminal of the control logic circuit 110 and a G terminal connected with a DCL side, a voltage V2 generated by a DC/DC converter 150. The control logic circuit 110 outputs control signals D1, D2 on the basis of a voltage signal inputted into a feed-back terminal. The control signal D1 is driving signal for controlling the FET1, and the control signal Dd2 is a driving signal for controlling the FET2. The control logic circuit 110 effects control of the FET1 and the FET2 via an FET driving circuit 120. A VS terminal of the control logic circuit 110 is used for detecting a voltage Vin charged in a smoothing capacitor C3 through detection of the voltage V1, obtained by rectifying and smoothing the forward voltage generated in the auxiliary winding P2 of the transformer T1, by division by a resistor R3 and a resistor R4.

The FET driving circuit 120 generates a gate driving signal DL of the FET1 in accordance with the control signal D1 inputted from the control logic circuit 110 and generates a gate driving signal DH of the FET2 in accordance with the control signal D2 from the control logic circuit 110. The voltage V1 is supplied to between the VC terminal and the GH terminal of the FET driving circuit 120. Further, in order to drive the FET2, by a charge pump circuit constituted by a capacitor C5 and a diode D5, the voltage V1 is supplied to between a VH terminal and a GH terminal. When the control signal D1 inputted from the control logic circuit 110 becomes a high level, the FET driving circuit 120 sets the gate driving signal DL of the FET1 at a high level and puts the FET1 in an on state. Similarly, when the control signal D2 inputted from the control logic circuit 110 becomes a high level, the FET driving circuit 120 sets the gate driving signal DH of the FET2 at a high level and puts the FET2 in an on state.

The DC/DC converter 150 is a 3-terminal regulator or a step-down digital control power source and outputs a voltage V2 to an OUT terminal from the voltage V1 inputted between the VC terminal and the G terminal of the DC/DC converter 150. An actuating circuit 130 is a 3-terminal regulator or a step-down digital control power source and outputs the voltage V1 to an OUT terminal from the voltage Vin inputted between the VC terminal and the G terminal thereof. The actuating circuit 130 operates only in the case where the voltage V1 supplied from the auxiliary winding P1 is not more than a predetermined voltage value and is used for supplying the voltage V1 during actuation of the digital control power source 100.

The feed-back circuit 140 is used for controlling a voltage Vout to a predetermined constant voltage. A voltage value of the voltage Vout is set by a reference voltage of a reference terminal REF of a shunt regulator IC5, the resistor R52 and the resistor R53. When the voltage Vout is higher than a predetermined voltage (24 V in this embodiment), a current increases from a cathode terminal K of the shunt regulator IC5, so that a current flowing through a secondary-side diode PC5a of a photo-coupler PC5 via a pull-up resistor R51 increases. Thereafter, a discharging current of electric charges of a capacitor C6 by a primary-side transistor PC5b of the photo-coupler PC5 increases, and therefore a voltage of the FB terminal of the control logic circuit 110 lowers.

Further, when the voltage Vout is not more than 24 V, the current flowing through the secondary-side diode PC5a of the photo-coupler PC5 decreases, so that the discharging current of the electric charges of the capacitor C6 by the primary-side transistor PC5b of the photo-coupler PC5 decreases. For this reason, a charging current flowing from the voltage V2 to the capacitor C6 via the resistor R2 becomes larger, so that the voltage of the FB terminal of the control logic circuit 110 increases. The control logic circuit 110 effects feed-back control for controlling the voltage Vout to the predetermined constant voltage by detecting the voltage of the FB terminal (FB terminal voltage). Thus, the control logic circuit 110 is capable of indirectly effecting the feed-back control of the voltage Vout by monitoring the FB terminal voltage. Further, in place of the feed-back circuit 140, a control logic circuit 110 is provided in a secondary side and monitors the voltage Vout, so that the voltage Vout may also be directly subjected to the feed-back control.

Further, the control logic circuit 110 monitors the FB terminal voltage and thus can discriminate a state of a load of the digital control power source 100. This is because with a larger secondary-side load, a voltage drop of the voltage Vout by a secondary-side diode D11 and capacitor C11 and the like is liable to generate, so that the FB terminal voltage of the control logic circuit 110 becomes larger. For this reason, the control logic circuit 110 can effect proper control depending on the load state by monitoring the FB terminal voltage. In order to accurately discriminate the load state, a current detecting means (not shown) may also be provided in a path along which electric power is supplied to the FET1 or a load of the digital control power source 100. The means for discriminating the low load state in this embodiment will be described as use of the FB terminal voltage of the control logic circuit 110. That is, in this embodiment, the control logic circuit 110 functions as a discriminating means for discriminating the low load state. Into the control logic circuit 110, a voltage obtained by dividing the voltage V2, generated by the DC/DC converter 150, by the resistors R5, R6 is inputted as a reference voltage Vref described later.

[Control Logic Circuit]

Figure 1B:
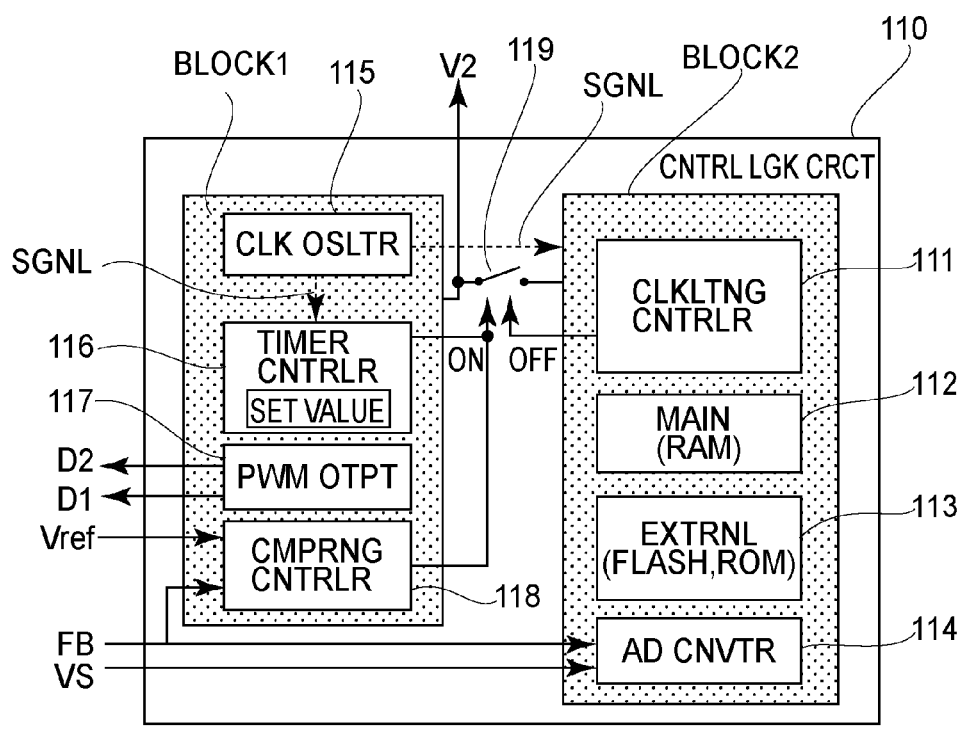
FIG. 1B is a schematic diagram showing a control logic circuit in Embodiment 1.

FIG. 1B is a schematic diagram of a circuit constitution of the control logic circuit 110. The control logic circuit 110 is divided into a block 1 and a block 2. The block 1 includes a clock oscillating portion 115, a timer controller 116, a PWM current portion 117 and a comparison controller 118. The block 2 includes a calculating controller 111 as a calculating means, a main storing portion 112 such as an RAM, an external storing portion 113 such as an ROM or a flash memory (FLASH), and an AD converting portion 114. The control logic circuit 110 is, for example, a microcomputer formed with one-chip integrated circuit. The calculating controller 111 is capable of setting a set value in the timer controller 116 as a measuring means.

The calculating controller 111 operates on the basis of a clock signal indicated by a broken-line arrow inputted from the clock oscillating portion 115 as a generating means and reads an instruction and data stored in the external storing portion 113 in the main storing portion 112, and then effect consecutive operation. On the basis of the FB terminal voltage detected by the AD converting portion 114, the calculating controller 111 effects control of the FET1 and FET2 by controlling set values (e.g., control start timing, period, duty) of the two control signals D1, D2 outputted from the PWM output portion 117. The calculating controller 111 compares the FB terminal voltage detected by the AD converting portion 114 with FBL1 described later, and discriminates whether or not a period changes from a switching period to a rest period which are described later. Incidentally, into the AD converting portion 114, the voltage obtained by dividing, by the resistors R3, R4, the voltage V1 obtained by rectifying and smoothing the forward voltage generated in the auxiliary winding P2 of the transformer T1 is inputted, and the control logic circuit 110 detects the voltage Vin.

The timer controller 116 is a timer used for controlling a length of the rest period of intermittent control described later with reference to FIG. 3, ad includes a circuit for storing the length of the rest period as a set value. The comparison controller 118 as a comparing means is a circuit for comparing the feed-back terminal voltage with the predetermined reference voltage Vref which is a second value, and is used in the intermittent control described with reference to FIG. 3. The reference voltage Vref is generated by dividing the voltage V2 by the resistors R5, R6. Details of control by the timer controller 116 and the comparison controller 118 will be described with reference to FIGS. 3 and 4.

Then, the block 1 and the block 2 of the control logic circuit 110 will be described. To the block 1, the voltage V2 generated by the DC/DC converter 150 is always supplied. The clock oscillating portion 115, the timer controller 116, the PWM current portion 117 and the comparison controller 118 of the block 1 can continue operations thereof even in a non-connection state in which a switch 119 as a connecting means for sleep control is disconnected (hereinafter referred to as an off state). Here, a state in which the switch 119 is in the off state and operations of the respective portions of the block 2 are at block refers to as a sleep state of the control logic circuit 110.

To the block 2 of the control logic circuit 110, the voltage V2 is supplied only in a connection state in which the switch 119 is connected (hereinafter referred to as an on state), and thus the block 2 can operate. The block 2 of the control logic circuit 110 is in a state in which the voltage V2 is not supplied, in the off state of the switch 119 (i.e., in the sleep state of the control logic circuit 110). For that reason, in the control logic circuit 110, it is possible to reduce electric power corresponding to electric power consumption by the respective functional portions disposed in the block 2.

In the control of the control logic circuit 110 in this embodiment, during a start of the rest period of the intermittent control described with reference to FIG. 3, the switch 119 is placed in the off state ("OFF" in FIG. 1B) by the calculating controller 111, so that supply of the voltage V2 to the block 2 is stopped. Further, the timing when the rest period of the intermittent control is ended is detected by the timer controller 116 or the comparison controller 118 of the block 1. When the timer controller 116 or the comparing controller 118 detects the timing when the rest period of the intermittent control ends, the switch 119 is placed in the on state ("ON" in FIG. 1B), and the supply of the voltage V2 to the block 2 is resumed. As a result, the calculating controller 111 is in a state in which the calculating controller 111 can resume the control.

(Other Control Logic Circuits)

Figure 2A:
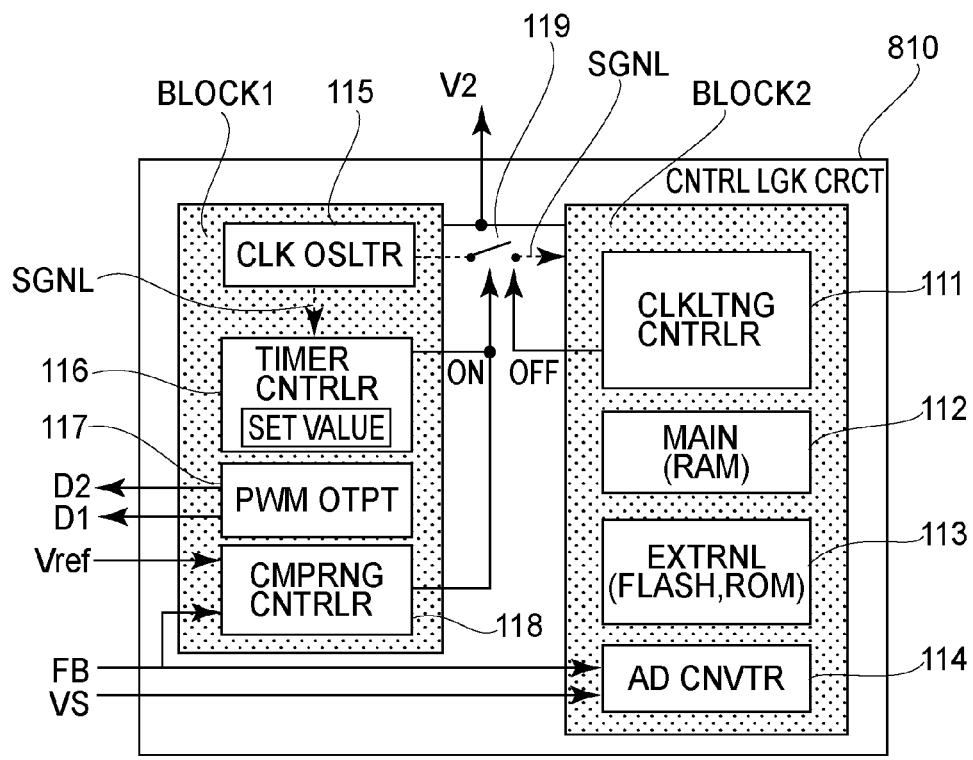
FIGS. 2A and 2B are schematic diagrams each showing a modified example of the control logic circuit in Embodiment 1.

As a similar method usable in place of the control logic circuit 110, a control logic circuit 810 having another constitution is shown in FIG. 2A. In FIG. 2A, constituent elements identical to those in FIG. 1B are represented by the same reference numerals or symbols and will be omitted from description. In the control logic circuit 810 in FIG. 2A, the voltage V2 generated by the DC/DC converter 150 is always supplied to the blocks 1, 2. Further, in the control logic circuit 810 in FIG. 2A, the switch 119 is provided to a signal line of the clock signal outputted from the clock oscillating portion 115 to the block 2. In FIG. 2A, when the calculating controller 111 puts the switch 119 in the off state during the start of the rest period of the intermittent control and the timer controller 116 or the comparison controller 118 detects the timing when the rest period of the intermittent control ends, the switch 119 is in the on state.

Thus, the control logic circuit 810 can reduce the electric power consumption of the circuit of the block 2 also by stopping, during the sleep, input of the clock signal, into the block 2, supplied to the functional portions disposed in the block 2. Incidentally, as in the control logic circuit 110, in the constitution in which the voltage V2 supplied to the functional portions disposed in the block 2 is stopped, also a leak current of the functional portions disposed in the block 2 can be reduced. For this reason, in the constitution of FIG. 1A, the electric power consumption can be further reduced.

As another similar method usable in place of the control logic circuit 110, there is a method in which a cyclic period of the clock signal supplied to the functional portions disposed in the block 2 in the sleep state is made extremely late. Further, as another similar method, there is a method in which the voltage V2 supplied to the functional portions disposed in the block 2 is lowered. Further, it would be considered that a combination of the above-described methods is used. In this embodiment, at least by the timer controller 116, the timing of ending the sleep state in the rest period of the intermittent control is detected and then the sleep state is eliminated, so that the period changes from the rest period to the switching period of the intermittent control.

Figure 2B:
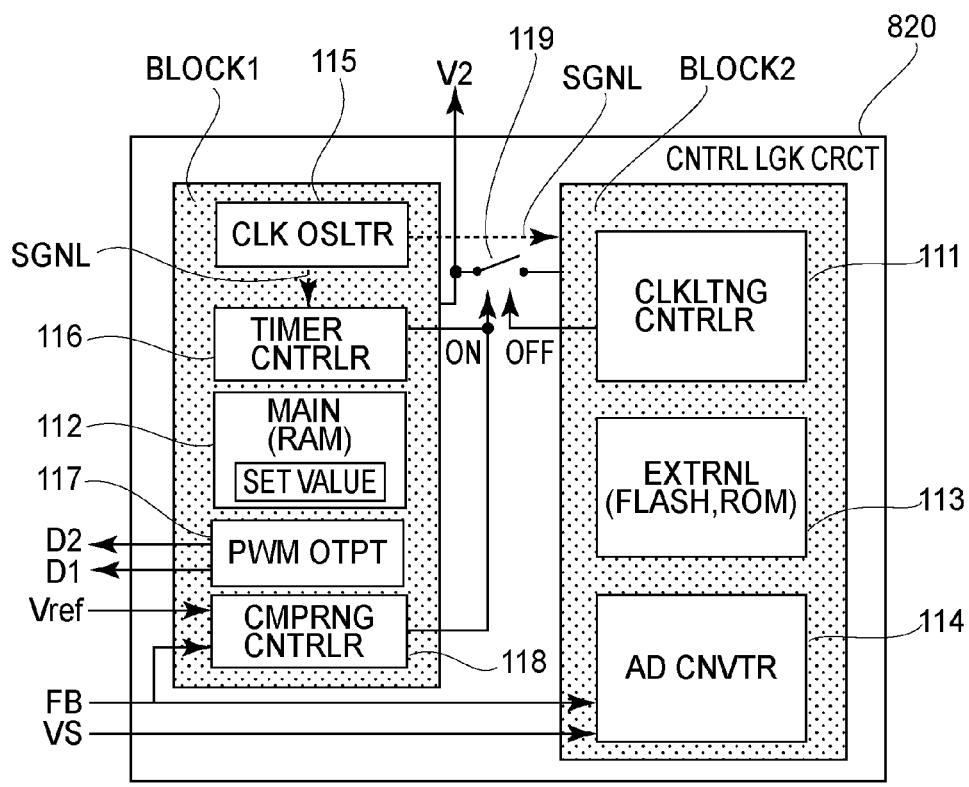

Further, as shown in a control logic circuit 820 of FIG. 2B, all or a part of the main storing portion 112 is disposed in the block 1. As a result, in the sleep state of the control logic circuit 820, even when the switch 119 is in the off state, it is possible to form a state in which the main storing portion 112 is operable. Further, the set value of the timer controller 116 is stored in the main storing portion 112 in advance, and then the timer controller 116 may also operate on the basis of the set value stored in the main storing portion 112. As a result, in the control logic circuit 820, there is an advantage that there is no need to provide the timer controller 116 with a circuit for storing the set value.

[Control Method Using Active Clamp Type]

Figure 3:
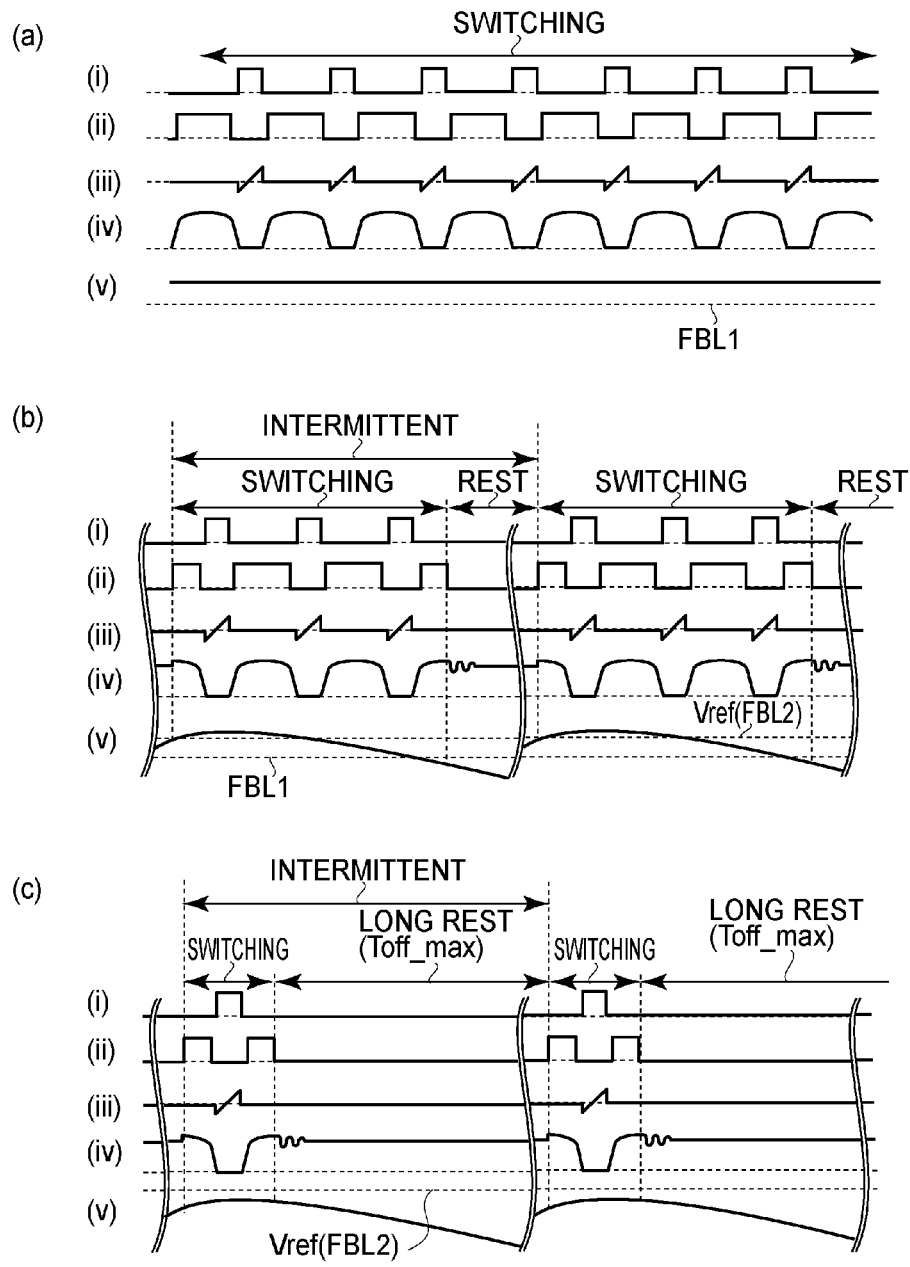
In FIG. 3, (a) to (c) are time charts for illustrating a control method in Embodiment 1.

In FIG. 3, (a) to (c) are time charts for illustrating control methods of the digital control power source 100 using an active clamp type. In (a) to (c) of FIG. 3, (i) shows a waveform of the control signal D1 outputted from the control logic circuit 110 to the FET driving circuit 120 and thus can also be said that (i) shows a waveform of the gate driving voltage DL of the FET1 outputted from the FET driving circuit 120. (ii) shows a waveform of the control signal D1 outputted from the control logic circuit 110 to the FET driving circuit 120 and thus can also be said that (ii) shows a waveform of the gate driving voltage DH of the FET2 outputted from the FET driving circuit 120. (iii) shows a drain current of the FET1, (iv) shows a voltage between the drain terminal and the source terminal of the FET1, and (v) shows the FB terminal voltage of the control logic circuit 110.

In (a) of FIG. 3, continuous control in which a switching period in which a switching operation of the FET1 and the FET2 is continuously performed is continuously controlled will be described. In the switching period, the control logic circuit 110 provides a dead time which is a period in which not only the FET1 but also the FET2 are turned off and repetitively controls the FET1 and the FET2 by alternately turning on and off the FET1 and the FET2. As described above, the control logic circuit 110 in this embodiment discriminates the load state on the basis of the FB terminal voltage. So long as the FB terminal voltage is kept in a state in which the FB terminal voltage is larger than the predetermined voltage value FBL1 which is a first value, the control logic circuit 110 discriminates that the heavy load state of the digital control power source 100 continues, and effects the continuous control in which the switching period is continued. In the continuous control shown in (a) of FIG. 3, when the FB terminal voltage is high, a ratio of an on-time of the FET1 to an on-time of the FET2 is controlled so as to be made high.

Incidentally, on the basis of the voltage Vin detected by the VS terminal, the control logic circuit 110 effects control so that the on-time of the FET1 is corrected so as to be shorter with an increasing voltage Vin. In other words, the control logic circuit 110 effects control so that the on-time of the FET1 is corrected so as to be inversely proportional to the voltage value of the voltage Vin. Further, in this embodiment, the control logic circuit 110 enables detection of the load on the basis of the FB terminal voltage by effecting control using the VS terminal.

In (b) of FIG. 3, intermittent control in which the switching period and the rest period in which the switching operation of the FET1 and the FET2 is at rest are repetitively provided will be described. When the continuous control described with reference to (a) of FIG. 3 is effected in the low load state of the digital control power source 100, efficiency of the digital control power source 100 lowers due to resistance loss by the primary-side current of the digital control power source 100, switching loss of the FETs 1, 2 and the like. For that reason, in the low load state of the digital control power source 100, as shown in (b) of FIG. 3, the intermittent control in which the switching period and the rest period which are described later are repeated is effected. As a result, by reducing the primary-side current of the digital control power source 100 and the number of times of switching of the FETs 1, 2 electric power efficiency of the digital control power source 100 in the low load state can be improved.

In this embodiment, when the FB terminal voltage of the control logic circuit 110 is lower than FBL1, the control logic circuit 110 discriminates that the digital control power source 100 is in the low load state, the change in period to the rest period is carried out. After the change to the rest period, when the FB terminal voltage is not less than the reference voltage Vref (FBL2) set in the comparison controller 118, the period of the control logic circuit 110 changes again to the switching period. In the digital control power source 100, the reference voltage Vref (FBL2) is set at a voltage larger than FBL1 (FBL2>FBL1), and uses overshooting and undershooting of the FB terminal voltage. As a result, the intermittent control shown in (b) of FIG. 3 is realized. Here, a period in which the switching period and the rest period are repetitively controlled is referred to as an intermittent control period. FBL1 is a threshold used for switching the period from the switching period to the rest period, and vref (FBL2) is a threshold used for switching the period from the rest period to the switching period.

In (c) of FIG. 3, a control method of the intermittent control period will be described. When the load of the digital control power source 100 is in a further low load state than the state of (b) of FIG. 3 and thus is insubstantially no load state, the rest period becomes a very long period. In the no load state, a state in which the FB terminal voltage is lower than the reference voltage Vref (FBL2) is maintained for a long period in some cases. When the rest period is longer than the predetermined period, a state in which the auxiliary winding P2 of the transformer T1 for outputting the voltage V1 and the electric power supplied to the DC/DC converter for generating the voltage V2 are insufficient is formed. Then, operations of the FET driving circuit 120 and the control logic circuit 110 cannot be continued, and therefore there is a need to supply electric power also from the actuating circuit 130. However, in the case where the voltage V1 is supplied from the voltage Vin charged in the smoothing capacitor C3 by using the actuating circuit 130, loss generating due to a potential difference between the voltage Vin and the voltage V2 becomes very large. In this case, the power source efficiency of the digital control power source 100 in the no load state lowers. Therefore, in this embodiment, by using the timer controller 116, a longest rest period Toff_max which is a first time is provided, and control is effected so that the rest period is not longer than the longest rest period Toff_max. As a result, in this embodiment, control is effected so that the voltage V1 supplied from the auxiliary winding P2 of the toner T1 is not insufficient.

Further, in the control method shown in (c) of FIG. 3, the longest rest period Toff_max is provided, and therefore the electric power supplied to the voltage Vout cannot be controlled by the length of the rest period. Therefore, in the case where the FB terminal voltage of the control logic circuit 110 lowers, FB control of the voltage Vout outputted at the secondary side is effected by shortening the on-time of the FET1 in the switching period. The digital control power source 100 using the active clamp type has the following characteristic. That is, the digital control power source 100 has a characteristic such that the electric power can be supplied to the auxiliary winding P2 of the transformer T1 without increasing the voltage Vout outputted at the secondary side, by setting the ratio of the on-time of the FET1 to the on-time of the FET2 at a sufficiently small value. By this characteristic, it is possible to supply the electric power to the auxiliary winding P2 of the transformer T1 for generating the voltage V1 and the DC/DC converter 150 for generating the voltage V2.

In the control of (c) of FIG. 3, in the case where the FB terminal voltage lowers, the control logic circuit 110 effects control of supplying the electric power to the auxiliary winding P2 in order to generate the voltages V1, V2 without increasing the voltage Vout outputted at the secondary side. As a result, in this embodiment, also in the no load state of the digital control power source 100, the operations of the FET driving circuit 120 and the control logic circuit 110 can be continued without operating the actuating circuit 130. Thus, the longest rest period Toff_max is provided using the timer controller 116, whereby it is possible to effect control so as to make the intermittent control period longer to the possible extent without operating the actuating circuit 130.

[Control in this Embodiment]

Figure 4:
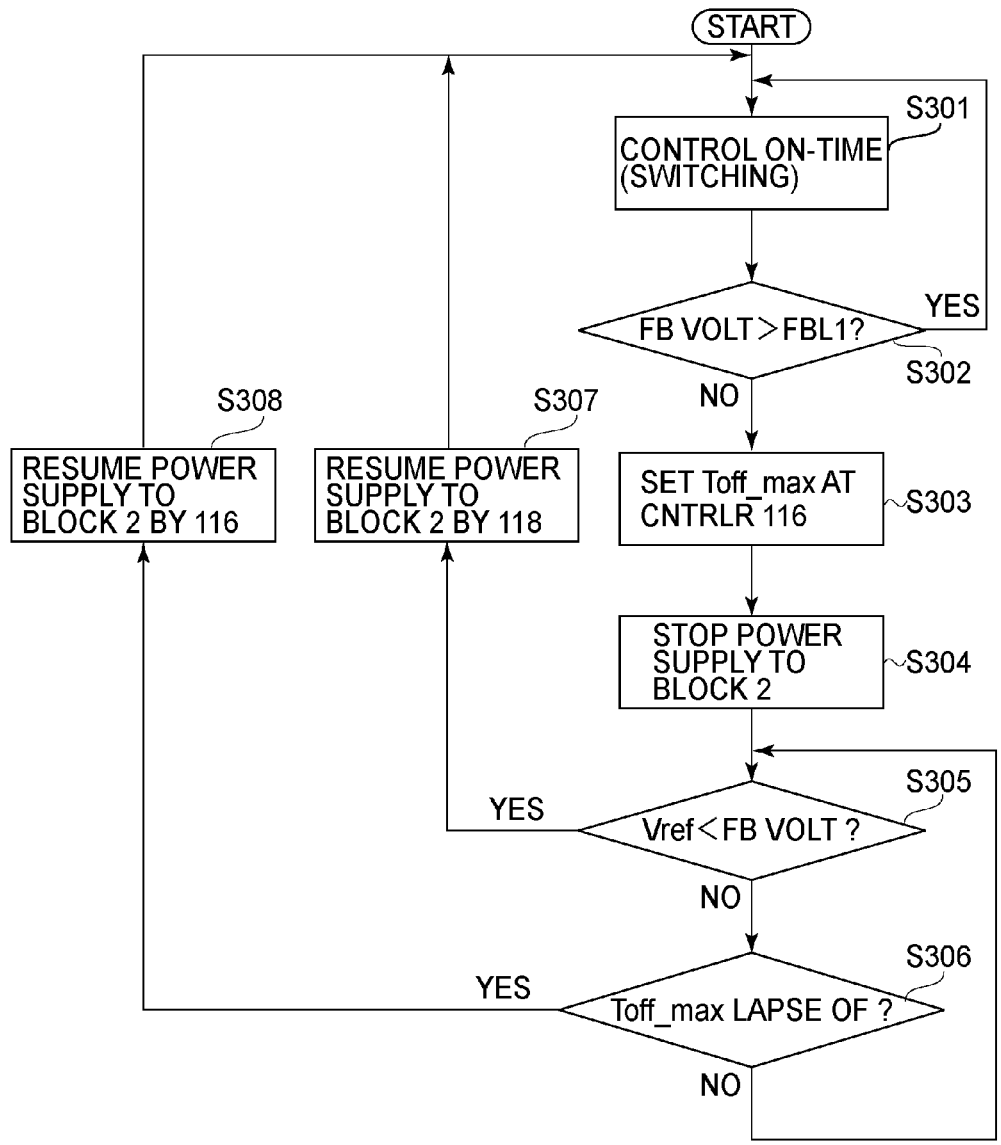
FIG. 4 is a flowchart showing control of a digital control power source in Embodiment 1.

FIG. 4 is a flowchart for illustrating a control sequence of the digital control power source 100 by the control logic circuit 110 in this embodiment. An AC power source 10 is connected with the digital control power source 100, and when a state in which the electric power is supplied to the digital control power source 100 is formed, the control logic circuit 110 starts the following control. In S(step)301, on the basis of the FB terminal voltage, the control logic circuit 110 effects control of the switching period in which the on-times of the FETs 1, 2 described with reference to (a) of FIG. 3 are controlled. In S302, the control logic circuit 110 discriminates whether or not the FB terminal voltage is larger than the predetermined value FBL1 for discriminating the low load state. In S302, in the case where the control logic circuit 110 discriminated that the FB terminal voltage is larger than FBL1, the control logic circuit 110 returns the process to S301 and effects the continuous control ((a) of FIG. 3) in which the switching period is continued. In S302, in the case where the control logic circuit 110 discriminated that the FB terminal voltage is not more than FBL1, the control logic circuit 110 causes the process to go to S303.

In S303, the control logic circuit 110 causes the calculating controller 111 to set the longest rest period Toff_max in the timer controller 116, and the timer is started. Incidentally, as in this embodiment, in the case where a period necessary to be set in the timer controller 116 is only one, the set value of the timer controller 116 may also be a fixed value. In S304, the control logic circuit 110 causes the calculating circuit 110 to put the switch 119 in the off state, so that the supply of the voltage V2 (electric power supply) to the block 2 is stopped (terminated).

In S305, the control logic circuit 110 discriminates whether or not the FB terminal voltage is larger than the reference voltage Vref (FBL2) by the comparison controller 118. In S305, in the case where the control logic circuit 110 discriminated that the FB terminal voltage is larger than the reference voltage Vref, the control logic circuit 110 causes the process to go to S307. In S307, the control logic circuit 110 causes the comparison controller 118 to put the switch 119 in the on state, and resumes the supply of the voltage V2 (electric power supply) to the block 2, so that control by the calculating controller 111 is in a resumable state, and the process is returned to S301. As a result, the period changes from the rest period to the switching period. In the process of S307, the switch 119 is turned on depending on that the FB terminal voltage is discriminated as being larger than the reference voltage Vref (FBL2) by the comparison controller 118, and this shows the intermittent control in (b) of FIG. 3.

In S305, in the case where the control logic circuit 110 discriminated that the FB terminal voltage is not more than the reference voltage Vref, the control logic circuit 110 causes the process to go to S306. In S306, the control logic circuit 110 discriminates whether or not the longest rest period Toff_max set in S303 has elapsed by the timer controller 116. In S306, in the case where the control logic circuit 110 discriminated that the longest rest period Toff_max has elapsed, the control logic circuit 110 causes the process to go to S308. In S308, the control logic circuit 110 causes the timer controller 116 to put the switch 119 in the on state, and resumes the supply of the voltage V2 (electric power supply) to the block 2, so that control by the calculating controller 111 is in a resumable state, and the process is returned to S301. As a result, the period changes from the rest period to the switching period. In the process of S308, the switch 119 is turned on depending on the discrimination by the timer controller 116 that the longest rest period Toff_max has elapsed, and this shows the intermittent control in (c) of FIG. 3. In S306, in the case where the control logic circuit 110 discriminated that the longest rest period Toff_max has not elapsed, the control logic circuit 110 returns the process to S305. As a result, the rest period is continued. By repeating the above-described control, the control logic circuit 110 effects the control of the digital control power source 100.

The digital control power source 100 in this embodiment possesses the following features.

(1) In the low load state of the digital control power source 100, the intermittent control in which the switching period and the rest period are repetitively provided is effected.

(2) In the rest period of the intermittent control, the sleep state in which the supply of the voltage V2 to the block 2 of the control logic circuit 110 is stopped is formed.

(3) In the case where the rise of the FB terminal voltage is detected by the comparison controller 118, the supply of the voltage V2 to the block 2 of the control logic circuit 110 is resumed, and a state in which control by the calculating controller 111 is enable is formed, so that the rest period is changed to the switching period.

(4) In the case where the timer controller 116 discriminated that the longest rest period Toff_max has elapsed, the supply of the voltage V2 to the block 2 of the control logic circuit 110 is resumed, and a state in which the control by the calculating controller 111 is enable is formed, so that the rest period is changed to the switching period.

Thus, the intermittent control is effected in the low load state of the digital control power source 100, and during the rest period of the intermittent control, the control logic circuit 110 is put in the sleep state in which the control by the timer controller 116 is enable. As a result, the intermittent control can be suitably controlled, so that it is possible to effect control so that not only the efficiency in the low load state can be improved but also the operation of the controller (control logic circuit 110, FET driving circuit 120 and the like) disposed in the primary side can be continued. As described above, according to this embodiment, not only the efficiency of the power source device in the low load state can be improved, but also the controller disposed in the primary side can continue the operation thereof.

Embodiment 2

[Control Method Using Active Clamp Type]

Figure 5:
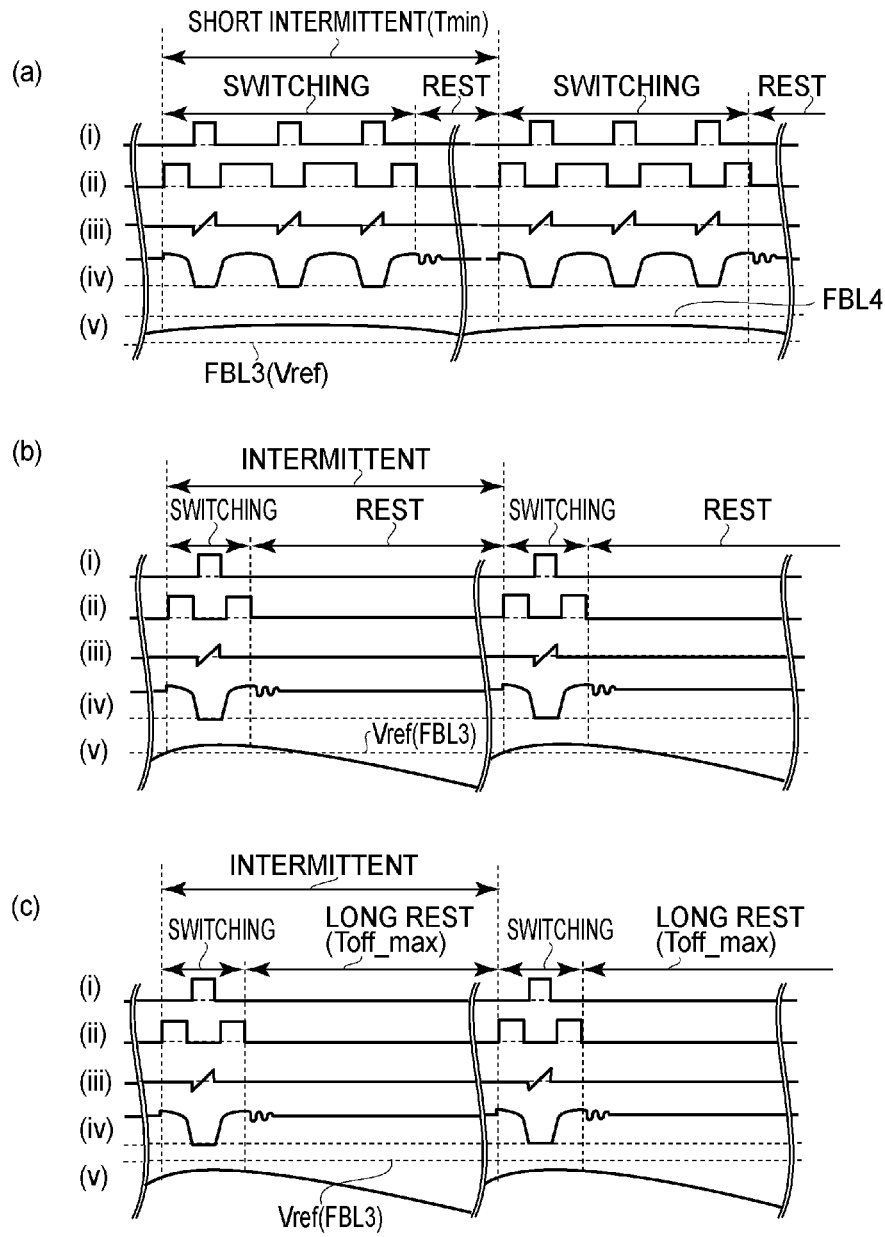
In FIG. 5, (a) to (c) are time charts for illustrating a control method in Embodiment 2.

In a control method described in Embodiment 2, a difference from the control method described in Embodiment 1 is that control such that the intermittent control period is longer than a predetermined shortest intermittent control period Tmin is added. In FIG. 5, (a) to (c) are time charts each illustrating the control method of the digital control power source 100 using the active clamp type in this embodiment. The description of the continuous control state is the same as that described with reference to (a) of FIG. 3 and therefore will be omitted from description. In this embodiment, in the case where the FB terminal voltage exceeds FBL4 which is the first value, the continuous control is effected. In (a), (b) and (c) of FIG. 5, first intermittent control, second intermittent control and third intermittent control, respectively, in this embodiment will be described. Incidentally, in FIG. 5, (i) to (v) show the same waveforms, signals or the like as those in FIG. 3. In this embodiment, Vref (FBL3) which is the second value is a threshold used for switching the period from the rest period to the switching period in the second intermittent control described later.

In the control of (a) of FIG. 5, the control is effected so that the intermittent control period is not excessively short, whereby control such that a high-frequency noise generated from the transformer T1 in the intermittent control state of the digital control power source 100 is suppressed is effected. As described later with reference to FIG. 6, by using control by the timer controller 116, Tmin is set as a shortest time of the intermittent control period. Hereinafter, Tmin is referred to as a shortest intermittent control period. In the intermittent control shown in (a) of FIG. 5, on the basis of the FB terminal voltage, the control logic circuit 110 controls the number of times of switching of the FET1 during the intermittent control period, whereby feed-back control of the voltage Vout outputted at the secondary side is effected. The control of (a) of FIG. 5 is the first intermittent control.

When the load state of the digital control power source 100 lowers from the load state of (a) of FIG. 5, finally, control of decreasing the number of times of switching of the FET1 to a predetermined number (once in this embodiment) is effected. Further, the load state of the digital control power source 100 lowers, and in the case where the FB terminal voltage lowers to not more than Vref (FBL3), the control of the control logic circuit 110 changes to the control of (b) of FIG. 5. For example, in the switching period, the control logic circuit 110 effects control such that is turns on the FET2 and then turns on the FET1, and thereafter turns on the FET2.

In the control of (b) of FIG. 5, the number of times of switching during the intermittent control period is a predetermined number (once in this embodiment). In the control of (b) of FIG. 5, control is effected in such a manner that the FET2 is turned on and then the FET1 is turned on once, and thereafter the FET2 is turned, so that the length of the intermittent control period is controlled. As a result, feedback control of the voltage Vout outputted at the secondary side is effected. The control logic circuit 110 continues the rest period of the intermittent control until a voltage higher than the reference voltage Vref (FBL3) set in the comparison controller 118 is detected after a lapse of the shortest intermittent control period Tmin. The control described with reference to (b) of FIG. 5 is the second intermittent control.

In the control shown in (c) of FIG. 5, similarly as in the intermittent control described with reference to (c) of FIG. 3, a control method of supplying the voltage V1 in the no load state of the digital control power source 100 is carried out. In the control shown in (c) of FIG. 5, the number of times of switching during the intermittent control period is determined by control in which the FET2 is turned on and then the FET1 turned on once, and then the FET2 is turned on again, and control in which the rest period is the longest rest period Toff_max.

In the control shown in (c) of FIG. 5, the on-time of the FET2 is a fixed time, and the control logic circuit 110 effects, on the basis of the FB terminal voltage, the feed-back control of the V Vout outputted at the secondary side by controlling the on-time of the FET1. Incidentally, the on-time of the FET2 may also be changed and may only be required to be controlled so that the ratio of the on-time of the FET1 to the on-time of the FET2 lowers. As regards the method of supplying the electric power to the auxiliary winding P2 of the transformer T1 without increasing the voltage Vout outputted at the secondary side, the method is similar to the method of (c) of FIG. 3, and therefore will be omitted from description. The control described in (c) of FIG. 5 is the third intermittent control.

As described above, in this embodiment, the continuous control is effected in the case where the FB terminal voltage exceeds FBL4 (FBL4<(FB terminal voltage)) and is changed to the first intermittent control in the case where the FB terminal voltage is not more than FBL4 (FBL4≥(FB terminal voltage)). Further, in this embodiment, the period is changed to the rest period in the second intermittent control in the case where the FB terminal voltage is not more than Vref (FBL3) (FBL3≥(FB terminal voltage)). Further, in this embodiment, the period is changed to the switching period in the second intermittent control in the case where the FB terminal voltage is larger than Vref (FBL3) (FBL3>(FB terminal voltage)).

[Control in this Embodiment]

Figure 6:
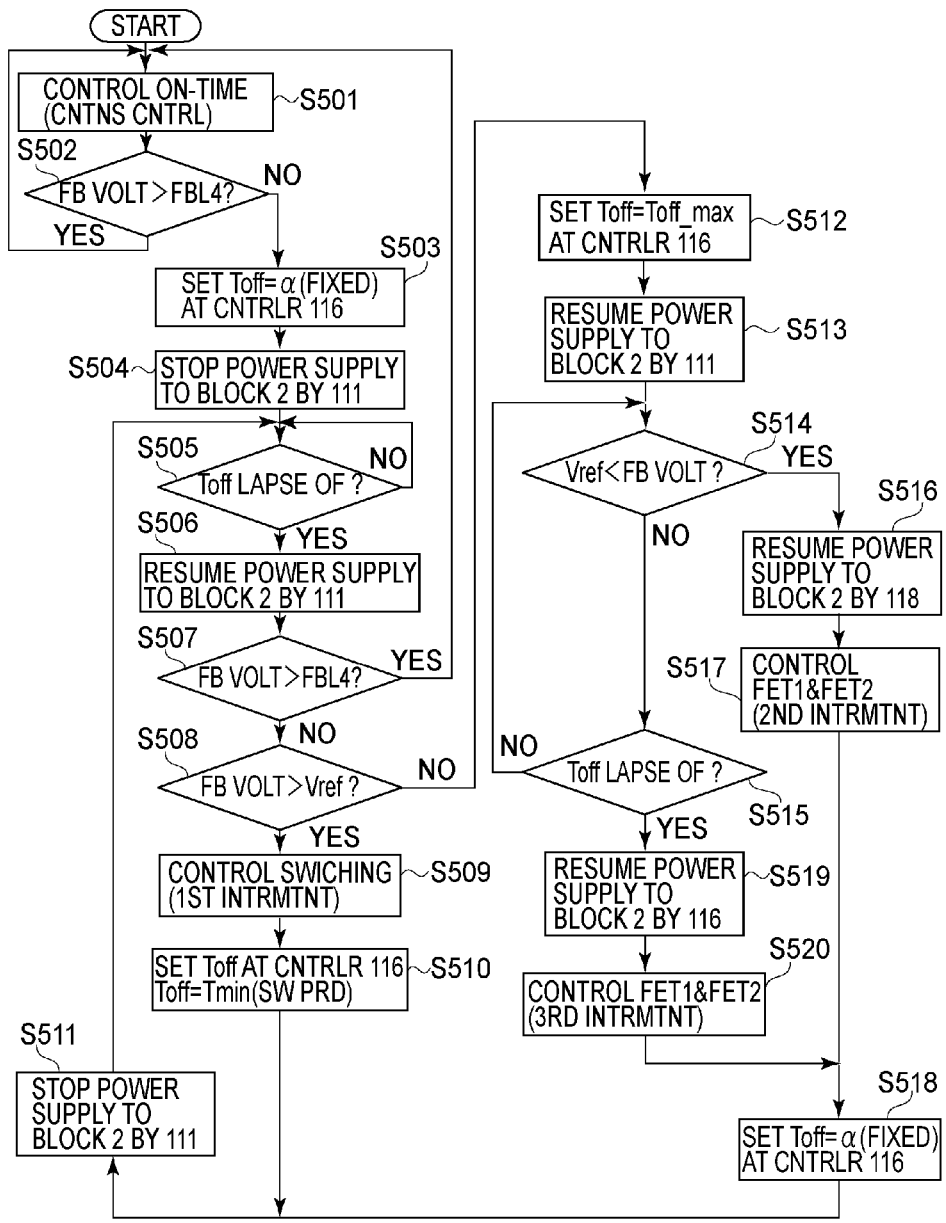
FIG. 6 is a flowchart showing control of a digital control power source in Embodiment 2.

FIG. 6 is a flowchart for illustrating a control sequence of the digital control power source 100 by the control logic circuit 110 in this embodiment. A method in which the first intermittent control, the second intermittent control and the third intermittent control described with reference to FIG. 5 are effected by the control logic circuit 110 will be described. An AC power source 10 is connected with the digital control power source 100, and when a state in which the electric power is supplied to the digital control power source 100 is formed, the control logic circuit 110 starts the following control. In S501, on the basis of the FB terminal voltage, the control logic circuit 110 effects control of the switching period in which the on-times of the FETs 1, 2 described with reference to (a) of FIG. 3 are controlled (continuous control state). In S502, the control logic circuit 110 discriminates whether or not the FB terminal voltage is larger than the predetermined value FBL4. In S502, in the case where the control logic circuit 110 discriminated that the FB terminal voltage is larger than FBL4, the control logic circuit 110 returns the process to S501 and continuous the switching period (continuous control state). In S502, in the case where the control logic circuit 110 discriminated that the FB terminal voltage is not more than FBL4, the control logic circuit 110 causes the process to go to S503.

In S503, the control logic circuit 110 causes the calculating controller 111 to set a predetermined value α as the rest period Toff in the timer controller 116, and the measurement of the time is started. Here, the rest period α is set as a period sufficiently shorter than the shortest intermittent control period Tmin described later (α<<Tmin) so as not to lower a load response characteristic of the digital control power source 100, and is used as a rest period during the change from the continuous control to the intermittent control.

Rest time Toff=α(fixed value)

In S504, the control logic circuit 110 causes the calculating circuit 110 to put the switch 119 in the off state, so that the supply of the voltage V2 (electric power supply) to the block 2 is stopped (terminated).

(First Intermittent Control)

The first intermittent control method described with reference to (a) of FIG. 5 are shown in S505-S511. In S505, the control logic circuit 110 discriminates, by the timer controller 116, whether or not the rest period Toff has elapsed. In S505, in the case where the control logic circuit 110 discriminated that the rest period Toff has not elapsed, the control logic circuit 110 returns the process to S505, and in the case where the control logic circuit 110 discriminated that the rest period Toff has elapsed, the control logic circuit 110 causes the process to go to S506. In S506, the control logic circuit 110 causes the timer controller 116 to put the switch 119 in the on state and resumes the supply of the voltage V2 to the block 2, so that the control logic circuit 110 puts the calculating controller 111 in a state in which the control is resumable.

In S507, the control logic circuit 110 discriminates, by the timer controller 116, whether or not the FB terminal voltage is larger than FBL4, and in the case where the control logic circuit 110 discriminated that the FB terminal voltage is larger than FBL4, the control logic circuit 110 returns the process to S501, and changes in state to the continuous control state. In S507, in the case where the control logic circuit 110 discriminated that the FB terminal voltage is not more than FBL4, the control logic circuit 110 causes the process to go to S508.

In S508, the control logic circuit 110 discriminates, by the timer controller 116, whether or not the FB terminal voltage is larger than Vref (FBL3). In S508, in the case where the control logic circuit 110 discriminated that the FB terminal voltage is larger than Vref (FBL3), the control logic circuit 110 causes the process to go to S509, and in the case where the control logic circuit 110 discriminated that the FB terminal voltage is not more than FBL3, the control logic circuit 110 causes the process to go to S512. In S512, the control logic circuit 110 changes in control to the second intermittent control or the third intermittent control.

In S509, the control logic circuit 110 effects the first intermittent control in which the number of times of switching is controlled on the basis of the FB terminal voltage ((a) of FIG. 5). The switching period in the first intermittent control is controlled so that the switching period is started by the turning-on of the FET2 and is ended by the turning-off of the FET2. In the first intermittent control in S509, the control logic circuit 110 effects the control so that the number of times of switching is larger with a higher FB terminal voltage and is smaller with a lower FB terminal voltage. The control logic circuit 110 controls the FET1 and the FET2 depending on the number of times of switching on the basis of the FB terminal voltage, and when the switching period is ended, the control logic circuit 110 causes the process to go to S510.

In S510, the control logic circuit 110 causes the timer controller 116 to set the rest period Toff so that a predetermined intermittent control period in the first intermittent control is Tmin. Here, the control logic circuit 110 measures a length of the switching period in the intermittent control by using an unused timer of the timer controller 116 or calculates the switching period length from the number of times of switching set in S509 and the on-times of the FETs 1, 2 ((a) of FIG. 5). For this reason, the rest period Toff which is the second time in the first intermittent control such that the intermittent control period is the shortest intermittent control period Tmin is obtained from the shortest intermittent control period Tmin being a known value and the switching period in accordance with the following formula.

Rest period Toff=Tmin(shortest intermittent control period)−(switching period)

In S511, the control logic circuit 110 causes the calculating controller 111 to put the switch 119 in the off state and stop the supply of the voltage to the block 2, and returns the process to S505. Thus, the control logic circuit 110 repetitively effects the control of S505 to S511, so that the control logic circuit 110 carries out the first intermittent control of the digital control power source 100. In the first intermittent control, the intermittent control period is not shorter than the shortest intermittent control period, and therefore the high-frequency noise of the transformer T1 can be reduced.

(Second Intermittent Control Method and Third Intermittent Control Method)

The second intermittent control method and the third intermittent control method which are described with reference to (b) of FIG. 5 and (c) of FIG. 5, respectively, will be described using s512 to S520. In S512, the control logic circuit 110 causes the calculating controller 111 to set the longest rest period Toff_max in the timer controller 116. In S513, the control logic circuit 110 causes the calculating circuit 110 to put the switch 119 in the off state, so that the supply of the voltage V2 to the block 2 is stopped (terminated).

In S514, the control logic circuit 110 discriminates whether or not the FB terminal voltage is larger than the reference voltage Vref (FBL3) by the comparison controller 118. In S514, in the case where the control logic circuit 110 discriminated that the FB terminal voltage is larger than the reference voltage Vref (FBL3), the control logic circuit 110 causes the process to go to S516, and changes in control to the second intermittent control of S516 and S517 ((b) of FIG. 5).

In S514, in the case where the control logic circuit 110 discriminated that the FB terminal voltage is not more than the reference voltage Vref, the control logic circuit 110 causes the process to go to S515. In S515, the control logic circuit 110 discriminates whether or not the rest period Toff set in S512, i.e., Toff_max, has elapsed by the timer controller 116. In S515, in the case where the control logic circuit 110 discriminated that the rest period Toff (the longest rest period Toff_max) has not elapsed, the control logic circuit returns the process to S514 and continues the rest period, and then repetitively effects the control of S514 and S515. In S515, in the case where the control logic circuit 110 discriminated that the rest period Toff (the longest rest period Toff_max) has elapsed, the control logic circuit 110 causes the process to go to S519 and changes in control to the third intermittent control of S519 and S520 ((c) of FIG. 5).

The switching period control method in the second intermittent control described using (b) of FIG. 5 will be described. In S516, the control logic circuit 110 causes the comparison controller 118 to put the switch 119 in the on state and resumes the supply of the voltage V1 to the block 2, and thus in a state in which the control of the calculating controller 111 resumable. In S517, the control logic circuit 110 subjects the FETs 1, 2 to the switching control by a predetermined number of times. For example, in this embodiment, as shown in (b) of FIG. 5, control such that the FET2 is turned on and then the FET1 is turned on once, and then the FET2 is turned on again is effected. In S517, the control logic circuit 110 controls the FET1 in a determined on-time by the predetermined number of times, and therefore controls the electric power by controlling the switching period length.

In S518, the control logic circuit 110 causes the timer controller 116 to set a fixed value σ as the rest period Toff, and causes the process to go to S511. The rest period σ is set as a period sufficiently shorter than the shortest intermittent control period Tmin so as not to lower the load response characteristic of the digital control power source 100, and is used as a rest period when the switching periods of the second intermittent control and the third intermittent control are ended. Incidentally, strictly, the rest period Toff is Toff_max+σ, but σ is the period sufficiently shorter than Toff_max. For this reason, in (c) of FIG. 5, only Toff_max is shown. Further, in S518, similarly as in S510, a process of setting the rest period Toff from the shortest intermittent control period Tmin and the switching period (the period of S517 in this case) may also be carried out.

Next, the switching period control method in the third intermittent control described using (c) of FIG. 5 will be described. In S519, the control logic circuit 110 causes the timer controller 116 to put the switch 119 in the on state, and resumes the supply of the voltage V2 (electric power supply) to the block 2. In S520, the control logic circuit 110 effects the switching control so as to turn on the FETs 1, 2 by the predetermined number of times, and causes the process to go to S518. For example, in this embodiment, as shown in (c) of FIG. 5, control such that the FET2 is turned on and then the FET1 is turned on once, and then the FET2 is turned on again is carried out. In the third intermittent control, the control logic circuit 110 effects control so that the on-time of the FET2 is fixed, and the on-time of the FET is made variable on the basis of the FB terminal voltage. Specifically, the control logic circuit 110 determines the on-time so that the on-time of the FET1 is longer with a higher FB terminal voltage and is shorter with a lower FB terminal voltage, and thus effects control. In S520, the control logic circuit 110 effects control of the electric power by controlling the on-time of the FET1 since the rest period is fixed (Toff_max).

By repetitively effecting the above-described control of S501 to S520, the control logic circuit 110 carries out the continuous control, the first intermittent control, the second intermittent control and the third intermittent control of the digital control power source 100.

Thus, in the control method described in this embodiment, the intermittent control period in the first intermittent control can be suitably controlled while reducing the electric power consumption of the control logic circuit 110 by the control using the timer controller 116 described using (a) of FIG. 5. Further, the control method described in this embodiment can prevent the high-frequency noise by the transformer T1. In this embodiment, in the first intermittent control, the intermittent control period is the fixed period Tmin.

The control method of the digital control power source 100 described using FIGS. 5 and 6 in this embodiment possesses the following features in addition to the features described in Embodiment 1.

(1) The intermittent control period is controlled by the timer controller 116 so as to be longer than the shortest intermittent control period Tmin.

(2) When the intermittent control is effected using the shortest intermittent control period Tmin, it is possible to carry out the first intermittent control in which the feed-back control of the power source voltage Vout outputted at the secondary side is effected by controlling the number of times of switching of the FET1 per (one) period.

(3) In the case where the rise of the FB terminal voltage is detected by the comparison controller 118, the rest period is changed to the switching period, and the second intermittent control in which the switching control of the FETs 1, 2 is carried out by the predetermined number of times can be effected.

(4) In the case where the timer controller 116 discriminated that the longest rest period Toff_max has elapsed, the rest period is changed to the switching period, and the third intermittent control in which the switching control of the FETs 1, 2 is carried out by the predetermined number of times can be effected.

Thus, in this embodiment, the intermittent control is effected in the low load state of the digital control power source 100, and during the rest period of the intermittent control, the control logic circuit 110 is put in the sleep state in which the control by the timer controller 116 is enable. As a result, the intermittent control can be suitably controlled, so that it is possible to effect control so that not only the efficiency in the low load state can be improved but also the high-frequency noise of the transformer can be prevented and the operation of the controller (control logic circuit 110, FET driving circuit 120 and the like) disposed in the primary side can be continued. As described above, according to this embodiment, not only the efficiency of the power source device in the low load state can be improved, but also the controller disposed in the primary side can continue the operation thereof.

Embodiment 3

[Digital Control Power Source]

Figure 7A:
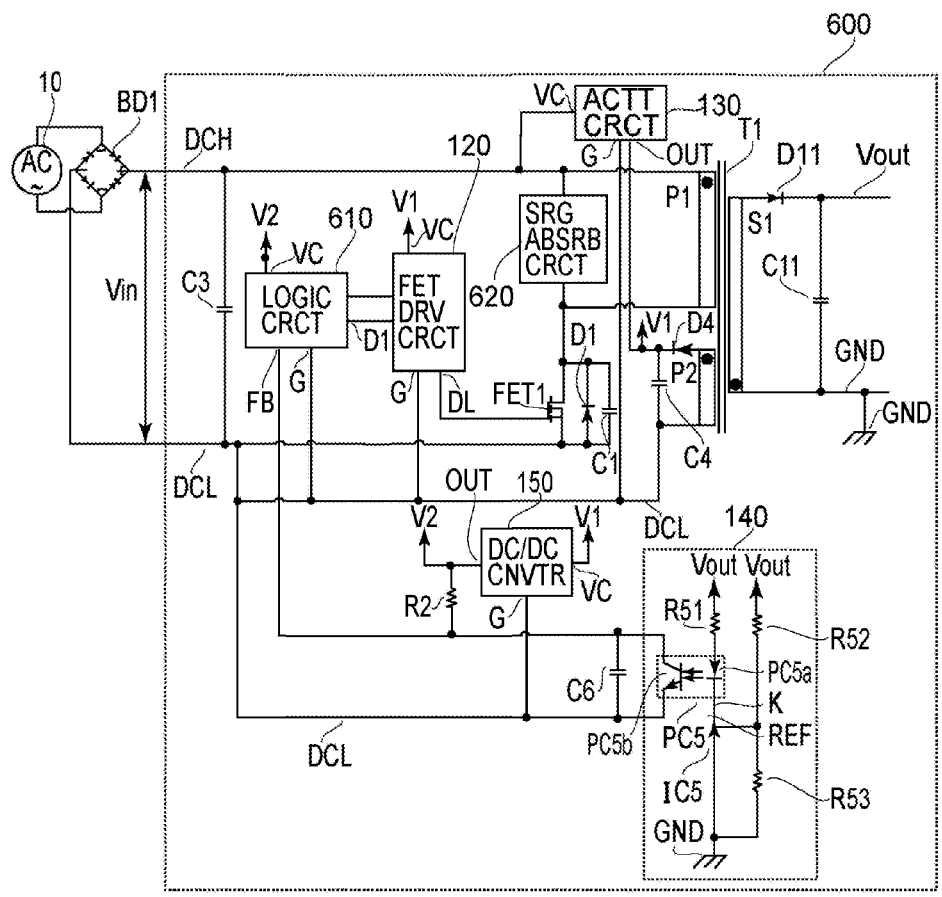
FIG. 7A is a diagram showing a power source device in Embodiment 3.
Figure 7B:
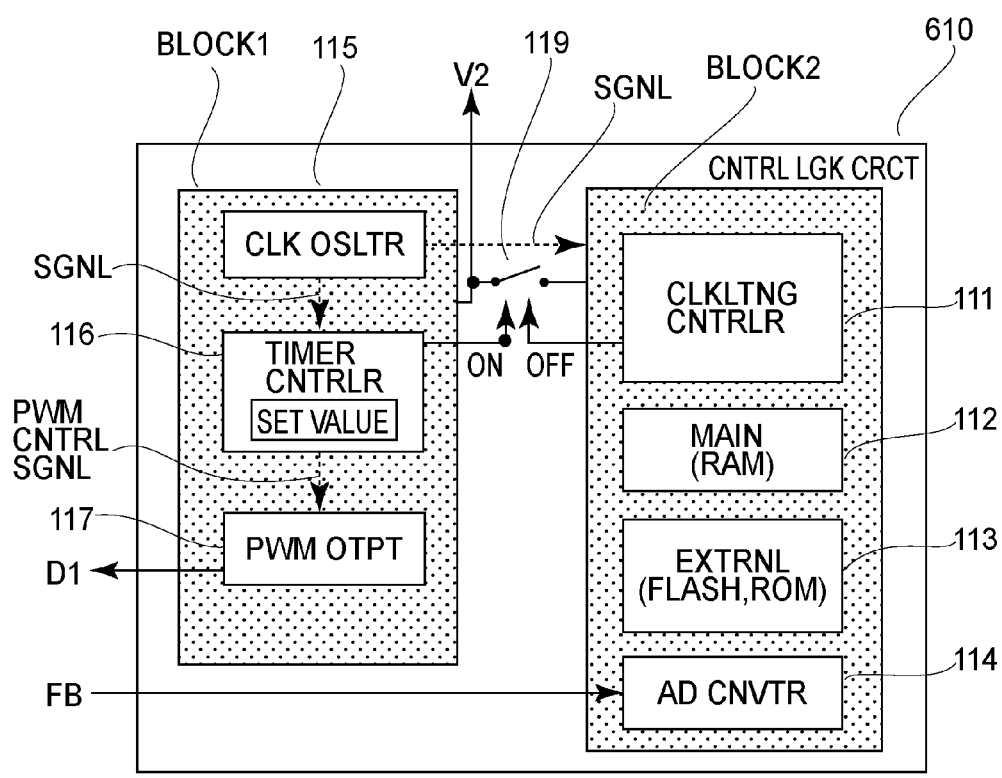
FIG. 7B is a schematic diagram showing a control logic circuit in Embodiment 3.

A digital control power source 600 in Embodiment 3 will be described. FIG. 7A is a circuit diagram of a power source device in this embodiment, and FIG. 7B is a schematic view of a control logic circuit in this embodiment. The digital control power source 600 has a power source constitution of a flyback type using a surge absorbing circuit 620 in place of the active clamp circuit using the FET2 and the capacitor C2 for the voltage clamp as in Embodiments 1 and 2. Further, a control logic circuit 610 of the digital control power source 600 has a constitution in which the comparison controller 118 in Embodiments 1 and 2 is not used. A control method using the timer controller 116 and the AD converting portion 114 in place of the comparison controller 118 will be described. For this reason, the reference voltage Vref inputted into the comparison controller 118 is not used. Constituent elements similar to those in FIG. 1 are represented by the same reference numerals or symbols and will be omitted from description.

The digital control power source 600 has a constitution in which only the FET1 is used as the switching element. A serge voltage generating when the FET1 is turned off is absorbed by the serge absorbing circuit 620 constituted by a snubber circuit or the like.

The control logic circuit 610 of the digital control power source 600 effects, on the basis of the FB terminal voltage, the feed-back control of the power source V Vout outputted at the secondary side by controlling the on-time of the FET1.

The control logic circuit 610 is a low-functional CPU which does not include the comparison controller 1118 compared with the control logic circuit 110 in Embodiments 1, 2. Further, the timer controller 116 has not only the function of controlling the rest period Toff described in Embodiments 1, 2 but also the function of outputting the PWM control signal used for generating the PWM signal in the switching period by the PWM outputting portion 117. Further, compared with the control logic circuit 110 in Embodiments 1, 2, the control logic circuit 610 in this embodiment does not include also the VS terminal, and thus does not detect the input voltage Vin.

[Control in this Embodiment]

Figure 8:
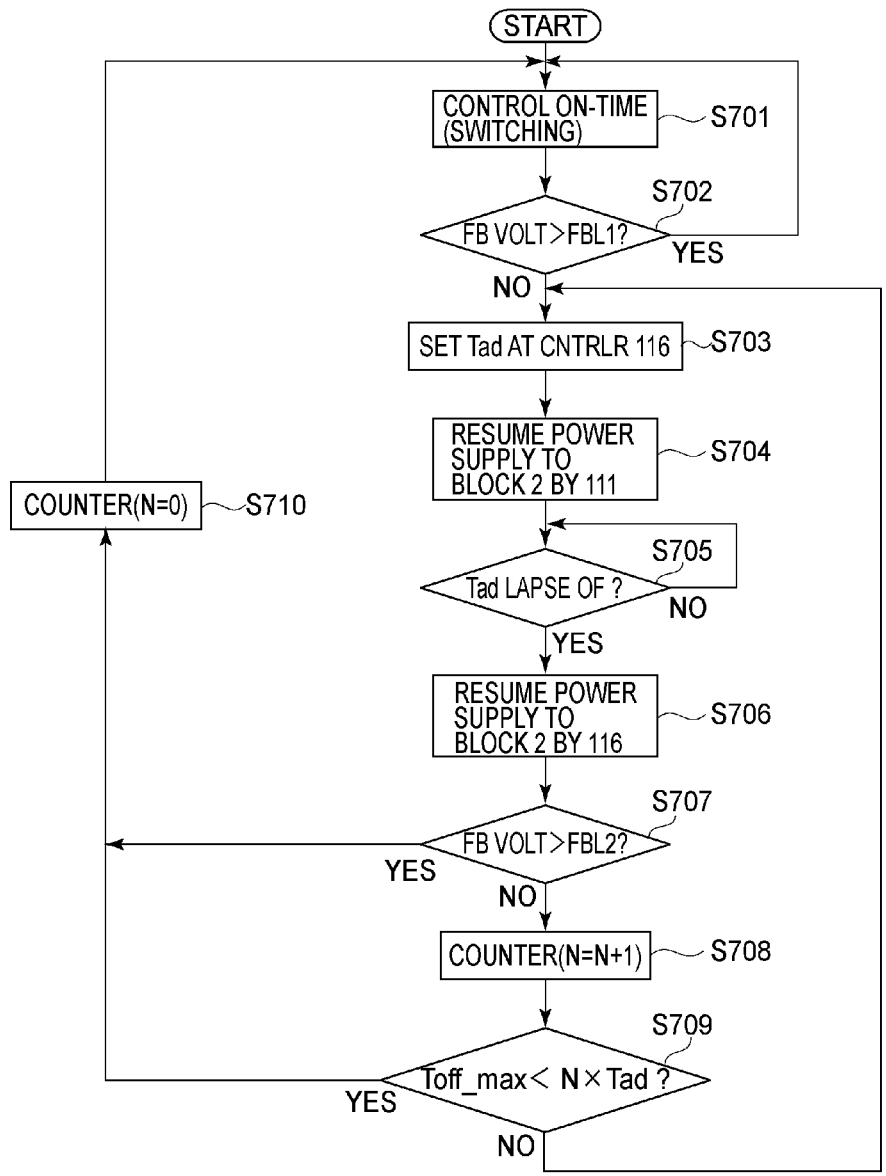
FIG. 8 is a flowchart showing control of a digital control power source in Embodiment 3.

FIG. 8 is a flowchart for illustrating a control sequence of the digital control power source 600 by the control logic circuit 610 in this embodiment. In FIG. 8, a method in which the intermittent control of the digital control power source 600 will be described by using the control logic circuit 600 which does not include the comparison controller 118. An AC power source 10 is connected with the digital control power source 600, and when a state in which the electric power is supplied to the digital control power source 600 is formed, the control logic circuit 610 starts the following control. Further, the control logic circuit 610 initializes a counter N described later in advance. In S701, on the basis of the FB terminal voltage, the control logic circuit 610 effects PWM control (control of the switching period) of the FET1. In this embodiment, the timer controller 116 generates the PWM control signal and outputs the PWM control signal to the PWM outputting portion 117. The PWM control signal has a fixed cyclic period, and on the basis of a value (set value) set by the calculating controller 111, duty control of the on-time of the FET1 is carried out. In S702, the control logic circuit 610 discriminates whether or not the FB terminal voltage is larger than the predetermined value FBL1. In S702, in the case where the control logic circuit 610 discriminated that the FB terminal voltage is larger than FBL1, the control logic circuit 610 returns the process to S701 and continuous the switching period (continuous control state). In S702, in the case where the control logic circuit 610 discriminated that the FB terminal voltage is not more than FBL1, the control logic circuit 610 causes the process to go to S703.

In S703, the control logic circuit 610 causes the calculating controller 111 to set a detection period Tad which is a third time of AD conversion in the timer controller 116. At this time, the control logic circuit 610 switches the function of the timer controller 116 from the function of generating the PWM control signal to the function of controlling the rest period in the intermittent control. The control signal D1 outputted from the PWM outputting portion 117 during the rest period is kept at a low level. In S704, the control logic circuit 110 causes the calculating circuit 110 to put the switch 119 in the off state, so that the supply of the voltage V2 (electric power supply) to the block 2 is stopped (terminated).

In S705, the control logic circuit 610 discriminates, by the timer controller 116, whether or not the AD conversion detection period Tad has elapsed. In S705, in the case where the control logic circuit 610 discriminated that the detection period Tad has not elapsed, the control logic circuit 610 returns the process to S705, and in the case where the control logic circuit 610 discriminated that the detection period Tad has elapsed, the control logic circuit 610 causes the process to go to S706. In S706, the control logic circuit 610 causes the timer controller 116 to put the switch 119 in the on state and resumes the supply of the voltage V2 to the block 2, so that the control logic circuit 110 puts the calculating controller 111 in a state in which the control is resumable. Further, by the process of S706, also the AD converting portion 114 and the calculating controller 111 are operable. Then, by the AD converting portion 114 and the calculating controller 111, discrimination based on the FB terminal voltage can be carried out.

In S707, the control logic circuit 610 discriminates, on the basis of a detection result of the AD converting portion 114, whether or not the FB terminal voltage is larger than FBL2. This control is equivalent to the control using the reference voltage Vref by the comparison controller 118 described using (b) of FIG. 3, and the reference voltage Vref=FBL2. In S707, in the case where the control logic circuit 610 discriminated that the FB terminal voltage is larger than FBL2, the control logic circuit 610 causes the process to go to S710. In S710, the control logic circuit 610 resets the counter N (N=0), and thereafter returns the process to S701, and then changes in period to the switching period. At this time, the control logic circuit 610 switches the function of the timer controller 116 from the function of controlling the rest period in the intermittent control to the function of generating the PWM control signal.

In S707, in the case where the control logic circuit 610 discriminated that the FB terminal voltage is not more than the predetermined voltage, specifically not more than FBL2, the control logic circuit 610 causes the process to go to S708, and increments the counter N by 1 (N=N+1) in S708. In S709, the control logic circuit 610 discriminates whether or not a value obtained by multiplying the counter N by the AD conversion detection period Tad (i.e., N×Tad) is larger than the longest rest period Toff_max. As a result, the control logic circuit 610 discriminates whether or not the longest rest period Toff_max has elapsed. In S709, in the case where the control logic circuit 610 discriminated that the voltage obtained by multiplying the counter N by the detection period Tad is larger than the longest rest period Toff_max, i.e., that the longest rest period Toff_max has elapsed, the control logic circuit 610 causes the process to go to S710. In S709, in the case where the control logic circuit 610 discriminated that the voltage obtained by multiplying the counter N by the detection period Tad is not more than the longest rest period Toff_max, i.e., that the longest rest period Toff_max has not elapsed, the control logic circuit 610 returns the process to S703, and continues the rest period. By repetitively carrying out the control of S701 to S710 described above, the control logic circuit 610 effects the control of the digital control power source 600.

Incidentally, in the control shown in FIG. 8, there is a need to resume the electric power supply to the block 2 of the control logic circuit 610 for each of the AD conversion detection periods during the rest period in the intermittent control. For this reason, compared with the control logic circuit 110 described in Embodiments 1, 2, there is a liability that the electric power consumption of the control logic circuit 610 increases. Further, when the detection period is set to be long, there is liability that responsiveness to the output voltage Vout of the digital control power source 100 lowers. For that reason, the control using the comparison controller 118 as in the case of the control logic circuit 110 is suitable control. However, as in the case of the control logic circuit 610, in the case were an inexpensive microcomputer or the like which does not have the function of the comparison controller 118, the control method described using FIG. 8 is effective.

The digital control power source 600 described using FIG. 7 in this embodiment possesses the following features in addition to the features of the method described in Embodiment 1.

(1) The control of the rest period in the intermittent control is effected by using the timer controller 116 and the AD converting portion 114 in combination in place of the comparison controller 118.

(2) The single timer function of the timer controller 116 is used for the control of the PWM outputting portion 117 and the control of the rest period of the intermittent control in combination.

Further, as described in this embodiment, the intermittent control method in this embodiment is also applicable to the digital control power source 600 which does not include the active clamp circuit (the FET2 and the voltage clamping capacitor C2).

Incidentally, the control using the control logic circuits 110, 810, 820 in Embodiments 1, 2 is also applicable to the digital control power source 600 of the flyback type in Embodiment 3. Further, the control using the control logic circuit 610 in Embodiment 3 is also applicable to the digital control power source 100 of the active clamp type in Embodiments 1, 2. Further, the control logic circuits 110, 810, 820 in Embodiments 1, 2 and the control logic circuit 610 in Embodiment 3 are also applicable to control of various power sources such as a power source of a forward type, a power source of a current resonance type, and a forward power source of an active clamp type. As described above, according to this embodiment, not only the efficiency of the power source device in the low load state can be improved, but also the controller disposed in the primary side can continue the operation thereof.

Embodiment 4

The digital control power sources 100, 600 as the power source devices described in Embodiments 1 to 3 are applicable to a low-voltage source of the image forming apparatus, i.e., a power source for supplying electric power to a driving portion such as a controller or a motor. In the following, a constitution of an image forming apparatus to which the power source devices of Embodiments 1 to 3 are applicable.

[Image Forming Apparatus]

Figure 9:
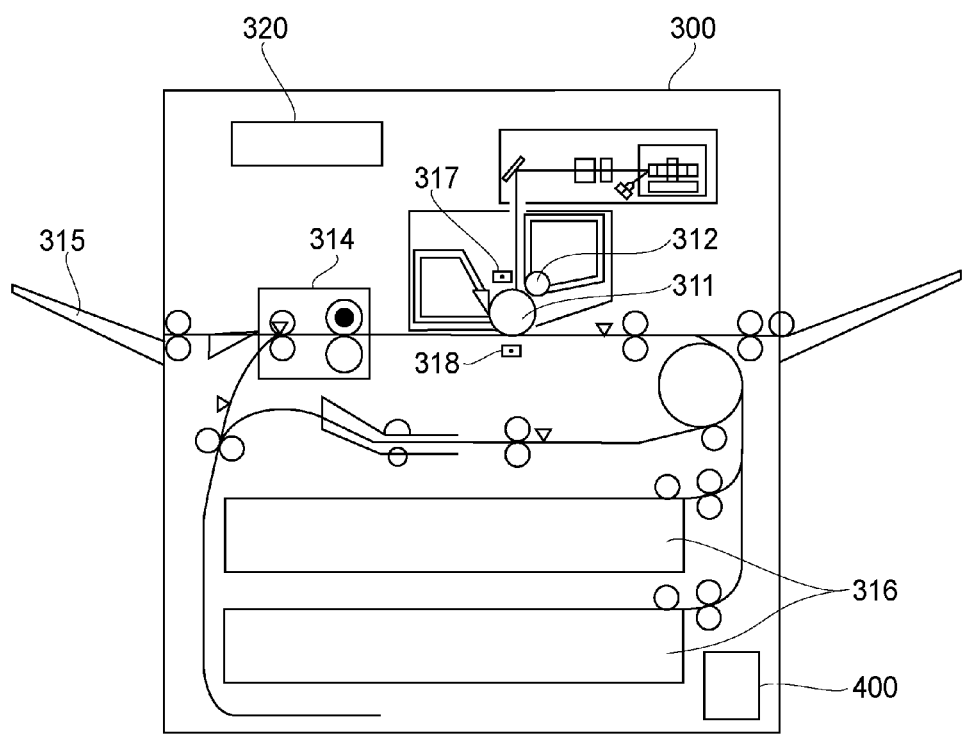
FIG. 9 is a schematic view showing a structure of an image forming apparatus in Embodiment 4.

As an example of the image forming apparatus, a laser beam printer will be described. FIG. 9 illustrates a schematic structure of the laser beam printer which is an example of an electrophotographic printer. A laser beam printer 300 includes a photosensitive drum 311 as an image bearing member for forming an electrostatic latent image, a charging portion (charging means) 317 for electrically charging the photosensitive drum 311 uniformly, and a developing portion (developing means) 312 for developing, with a toner, the electrostatic latent image formed on the photosensitive drum 311. The toner image formed on the photosensitive drum 311 is transferred by a transfer portion (transfer means) 318 onto a sheet (not shown) as a recording material supplied from a cassette 316, and then the toner image transferred on the sheet is fixed by a fixing device 314 and thereafter the sheet is discharged onto a tray 315. The photosensitive drum 310, the charging portion 317, the developing portion 312 and the transfer portion 318 constitute an image forming portion. Further, the laser beam printer 300 includes a power source device 400 having the same constitution as those of the digital control power sources 100, 600 as described in Embodiments 1 to 3. The image forming apparatus to which the power source device 400 in Embodiments 1 to 3 applicable is not limited to the image forming apparatus shown in FIG. 9, but may also be an image forming apparatus including a plurality of image forming portions, for example. The image forming apparatus may also be an image forming apparatus including a primary transfer portion where the toner image is transferred from the photosensitive drum 311 onto an intermediary transfer belt and a secondary transfer portion where the toner image is transferred from the intermediary transfer belt onto the sheet.

The laser beam printer 300 includes a controller 320 for controlling an image forming operation by the image forming portion and a sheet feeding operation, and the power source device supplies electric power to the controller 320, for example. Further, the power source device 400 supplies the electric power to a motor or the like for driving various rollers for rotating the photosensitive drum 311 for feeding the sheet. In the case where the power source device 400 in this embodiment is the digital control power sources 100, 600, in Embodiments 1 to 3, the following control is effected. The control logic circuit 110 causes the timer controller 116 to put the switch 119 in the on state so that the rest period in the intermittent control is not longer than the longest rest period, so that the period thereof changes to the switching period. As a result, not only the efficiency in the low load state can be improved, but also the controller disposed in the primary side can continue the operation thereof. Further, the power source device 400 in this embodiment is the digital control power source 100 in Embodiment 2, the following control is effected. The control logic circuit 110 effects control so that the intermittent control period in the intermittent control is not shorter than the shortest intermittent control period Tmin. As a result, not only the efficiency in the low load state can be improved, but also the controller disposed in the primary side can continue the operation thereof, and it is also possible to reduce the high-frequency noise. Further, in the case where the power source device 400 is the digital control power source 600 in Embodiment 3, the control can also be effected by the control logic circuit 610 using the inexpensive microcomputer or the like which does not include the comparison controller.

Further, the image forming apparatus in this embodiment is operable in the normal operation mode, the stand-by mode and the sleep mode. For example, the normal operation mode corresponds to the mode of (a) of FIG. 3. In the stand-by mode, the image forming operation can be carried out soon when the image forming apparatus receives the print instruction, while reducing the electric power consumed in the mode compared with the normal operation mode. For example, the stand-by mode corresponds to the mode of (b) of FIG. 3. In the sleep mode, the electric power consumed in the mode is further reduced compared with the stand-by mode. For example, the sleep mode corresponds to the mode of (c) of FIG. 3. As described above, according to this embodiment, it is possible to not only improve the electric power of the power source device in the low load state but also realize continuation of the operation of the controller disposed in the primary side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-247609 filed on Dec. 18, 2015, which is hereby incorporated by reference herein in its entirety.

What is claimed is:

1. A power source device, comprising:
a transformer including a primary winding and a secondary winding;
a switching element configured to enable or disable a supply of electric power to the primary winding by a switching operation;
a controller configured to control the switching operation,
wherein said controller is capable of effecting (i) continuous control in which the switching operation is continued, and (ii) intermittent control in which a switching period in which the switching operation is performed and a rest period in which the switching operation is at rest are repeated,
a calculating portion configured to (i) operate for generating a signal for controlling an operation of said switching element in a state that electric power is supplied, and (ii) not have electric power in the rest period so as to reduce electric power consumption; and
a measuring portion configured to measure time in the rest period,
wherein when the time measured by said measuring portion reaches a predetermined time period in the rest period, said calculating portion resumes the operation of generating the signal for controlling the operation of said switching element.

2. A power source device according to claim 1, further comprising:
a feed-back portion configured to feed back a voltage outputted from the secondary winding,
wherein on the basis of the voltage fed back from said feed-back portion, said calculating portion controls an on-time of said switching element in the switching period.

3. A power source device according to claim 2, wherein said controller effects the continuous control when the fed back voltage exceeds a first value and effects the intermittent control when the fed back voltage is not more than the first value.

4. A power source device according to claim 3, wherein said controller includes a comparing portion, that operates in the rest period, for comparing the fed back voltage with a reference voltage,
wherein when the fed back voltage exceeds the reference voltage before the predetermined time period has elapsed, said comparing portion causes said calculating portion to resume the operation of generating the signal for controlling the operation of said switching element, and the rest period changes to the switching period.

5. A power source device according to claim 4, wherein on the basis of the fed back voltage, said calculating portion controls the on-time of said switching element in the switching period.

6. A power source device according to claim 4, wherein on the basis of the fed back voltage, said calculating portion controls the number of times of turning-on of said switching element in the switching period.

7. A power source device according to claim 4, wherein said measuring portion prevents said calculating portion from resuming the operation of generating the signal for controlling the operation of said switching element until a second time period has elapsed from the start of the rest period.

8. A power source device according to claim 4, wherein said controller includes a connecting portion configured to switch a connection state or a non-connection state of electric power supplied to said calculating portion, and
wherein said comparing portion causes said calculating portion to resume the operation of generating the signal for controlling the operation of said switching element by putting said connecting portion in the connection state.

9. A power source device according to claim 4, wherein said controller includes,
a generating portion, that continues to operate in the rest period, for generating a clock signal, and
a connecting portion configured to switch a connection state or a non-connection state of the clock signal with said calculating portion,
wherein said comparing portion causes said calculating portion to resume the operation of generating the signal for controlling the operation of said switching element by putting said connecting portion in the connection state.

10. A power source device according to claim 1, further comprising:
a feed-back portion configured to feed back a voltage outputted from the secondary winding,
wherein on the basis of the voltage fed back from said feed-back portion, said calculating portion determines an on-time of said switching element in the switching period and turns said switching element on a predetermined number of times.

11. A power source device according to claim 1, wherein said measuring portion causes said calculating portion to resume the operation of generating the signal for controlling the operation of said switching element every lapse of a third time period shorter than the predetermined time period in the rest period, and
wherein said calculating portion changes to the switching period when the fed back voltage is higher than a predetermined voltage, and continues the rest period when the fed back voltage is not more than the predetermined voltage.

12. A power source device according to claim 1, wherein said controller includes a connecting portion for switching a connection state or a non-connection state of electric power supplied to said calculating portion, and
wherein said measuring portion causes said calculating portion to resume the operation of generating the signal for controlling the operation of said switching element by putting said connecting portion in the connection state.

13. A power source device according to claim 12, wherein said calculating portion puts said connecting portion in the connection state when the switching period changes to the rest period.

14. A power source device according to claim 1, wherein said controller includes,
a generating portion, that continues to operate in the rest period, for generating a clock signal, and
a connecting portion configured to switch a connection state or a non-connection state of the clock signal with said calculating portion,
wherein said measuring portion causes said calculating portion to resume the operation of generating the signal for controlling the operation of said switching element by putting said connecting portion in the connection state.

15. A power source device according to claim 1, wherein, in the rest period, supply of electric power to said calculating portion is stopped.

16. A power source device according to claim 1, further comprising an actuating unit configured to supply electric power to said switching element during actuation of said power source device,
wherein electric power is supplied to said switching element from a primary side of said transformer and not supplied to said switching element from said actuating unit in a period when said controller effects the intermittent control.

17. An image forming apparatus comprising:
an image forming portion for forming an image; and
a power source device for supplying electric power to said image forming apparatus,
wherein said power source device includes,
a transformer including a primary winding and a secondary winding,
a switching element configured to enable or disable a supply of electric power to the primary winding by a switching operation,
a controller configured to control the switching operation, wherein said controller is capable of effecting (i) continuous control in which the switching operation is continued, and (ii) intermittent control in which a switching period in which the switching operation is performed and a rest period in which the switching operation is at rest are repeated,
a calculating portion configured to operate (i) for generating a signal for controlling an operation of said switching element in a state that electric power is supplied, and (ii) not have electric power in the rest period so as to reduce electric power consumption, and
a measuring portion configured to measure a time in the rest period,
wherein when the time measured by said measuring portion reaches a predetermined time period in the rest period, said calculating portion resumes the operation of generating the signal for controlling the operation of said switching element.

18. An image forming apparatus according to claim 17, wherein said image forming apparatus is capable of switching among a normal operation mode in which an image forming operation is carried out, a stand-by mode in which the image forming operation is not carried out and the electric power consumption is lower than that in the normal operation mode, and a sleep mode in which the electric power consumption is lower than that in the stand-by mode, and
wherein said controller controls the operation of said switching element so that said image forming apparatus carries out the intermittent control in the stand-by mode or in the sleep mode.

19. An image forming apparatus according to claim 17, further comprising an actuating unit configured to supply electric power to said switching element during actuation of said power source device,
wherein electric power is supplied to said switching element from a primary side of said transformer and not supplied to said switching element from said actuating unit in the stand-by mode.

20. A power source comprising:
a transformer including a primary winding and a secondary winding;
a switching element configured to enable or disable a supply of electric power to the primary winding by a switching operation; and
a controller configured to control the switching operation, wherein said controller includes a first unit configured to output a signal for controlling an operation of said switching element, and a second unit configured to perform a process different from the first unit and to be capable of switching in a supply state in which electric power is supplied or in a non-supply state in which electric power is not supplied,
wherein said controller is capable of switching in an intermittent operation in which a rest period in which said switching element is at rest and a switching period in which said switching element is continuously performed are repeated, and in a continuous operation in which said switching element is continuously performed without the rest period, and
wherein said second unit is switched to the non-supply state in a predetermined time period within the rest period in the intermittent operation.

21. A power source according to claim 20, further comprising a timer configured to measure time until the predetermined time period has elapsed from the start of the rest period,
wherein said second unit maintains in the non-supply state until the time measured by said timer reaches the predetermined time period and is switched to in the supply state at a timing when the time measured by said timer reaches the predetermined time period.

22. A power source according to claim 21, wherein the second unit is switched to in the supply state when a value corresponding to the induced voltage in the second winding exceeds a threshold value before the predetermined time period has elapsed within the rest period in the intermittent operation.

23. A power source according to claim 20, wherein said first unit outputs a signal for switching said second unit in the supply state in which electric power is supplied.

24. A power source according to claim 20, wherein the first unit includes a comparing portion for comparing an output value corresponding to an output voltage from the second winding of said transformer with a reference value and controls the switching operation based on a comparison result of said comparing portion.

25. A power source according to claim 20, wherein an induced voltage in the second winding in the intermittent operation is lower than an induced voltage in the second winding in the continuous operation.

26. A power source according to claim 20, wherein the second unit calculates the times period of turning on or the number of times of turning on of said switching element in the switching period.

27. An image forming apparatus according to claim 26, further comprises a timer configured to measure time until the predetermined time period has elapsed from the start of the rest period,
wherein said second unit maintains the non-supply state until the time measured by said timer reaches the predetermined time period and is switched to the supply state at a timing when the time measured by said timer reaches the predetermined time period.

28. An image forming apparatus according to claim 26, wherein said image forming apparatus operates in a first mode for image forming and in a second mode for non-image forming at electric power consumption lower than electric power consumption in the first mode, wherein said controller switches the switching operation to the continuous operation in the first mode and to the intermittent operation in the second mode.

29. An image forming apparatus according to claim 26, further comprising an actuating unit configured to supply electric power to said switching element during actuation of said power source device,
wherein electric power is supplied to said switching element from a primary side of said transformer and not supplied to said switching element from said actuating unit in the second mode.

30. A power source according to claim 20, further comprising an actuating unit configured to supply electric power to said switching element during actuation of said power source device, wherein electric power is supplied to said switching element from a primary side of said transformer and not supplied to said switching element from said actuating unit in a period when said controller effects the intermittent control.

31. A power source device according to claim 20, wherein said first unit includes a connecting portion for switching a connection state or a non-connection state of electric power supplied to said second unit, and
wherein said second unit resumes the operation of generating the signal for controlling the operation of said switching element by putting said connecting portion in the connection state.

32. A power source device according to claim 20, wherein said first unit includes, a generating portion, that continues to operate in the rest period, for generating a clock signal, and a connecting portion configured to switch a connection state or a non-connection state of the clock signal with said second unit,
wherein said second unit resumes the operation of generating the signal for controlling the operation of said switching element by putting said connecting portion in the connection state.

33. An image forming apparatus comprising:
an image forming portion for forming an image; and
a power source device for supplying electric power to said image forming apparatus,
wherein said power source device includes,
a transformer including a primary winding and a secondary winding;
a switching element configured to enable or disable a supply of electric power to the primary winding by a switching operation;
a controller configured to control the switching operation,
wherein the controller includes a first unit configured to output a signal for controlling an operation of said switching element, and a second unit configured to perform a process different from the first unit and to be capable of switching in a supply state in which electric power is supplied or in a non-supply state in which electric power is not supplied; and
wherein the controller is capable of switching in an intermittent operation in which a rest period in which the switching element is at rest and a switching period in which the switching element is continuously performed are repeated, and in a continuous operation in which the switching element is continuously performed without the rest period,
wherein the second unit is switched to in the non-supply state in a predetermined time period within the rest period in the intermittent operation.

* * * * *